May 20, 1952     W. RAHR     2,597,127
TOASTER
Filed Oct. 18, 1946     2 SHEETS—SHEET 2
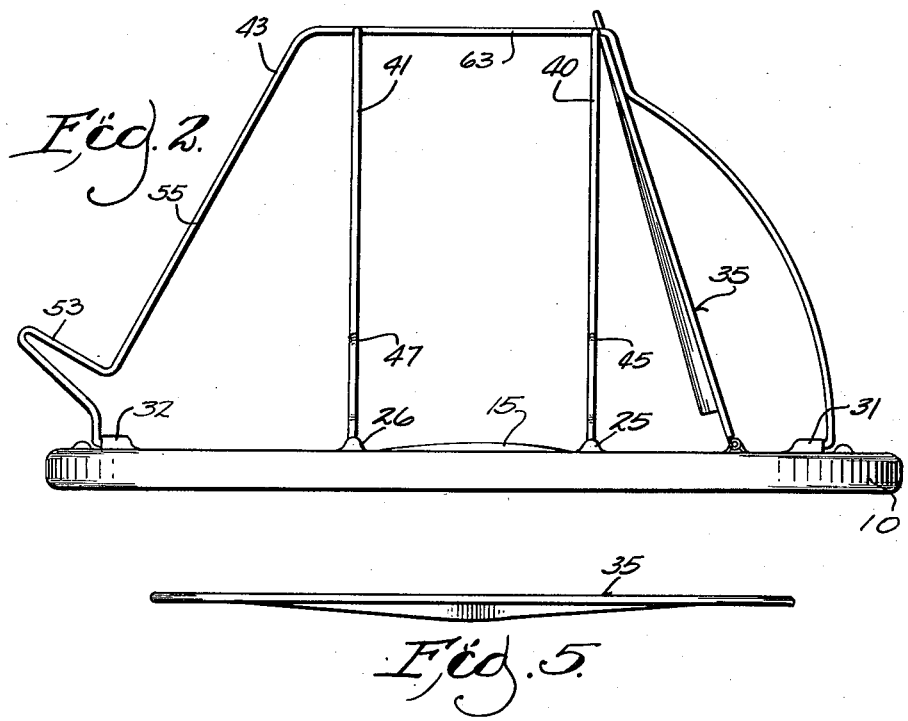
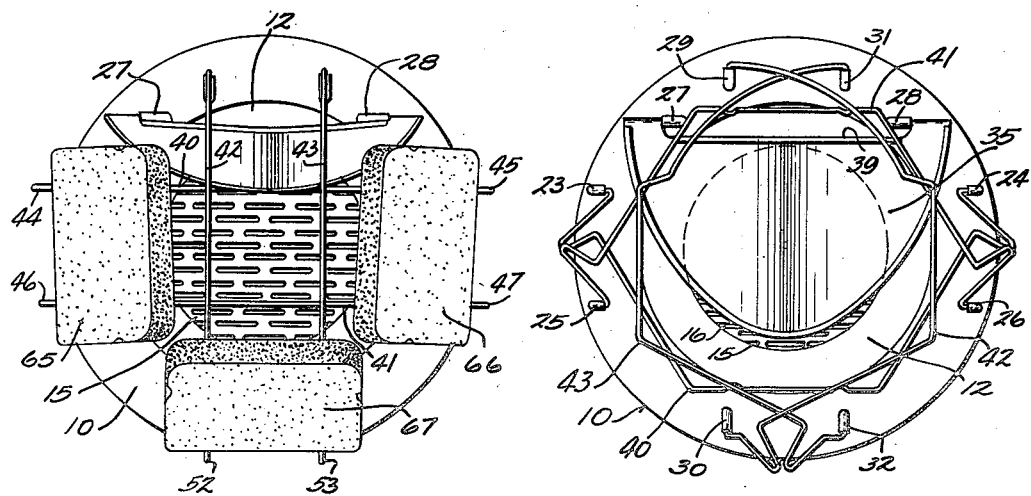
INVENTOR.
WILLIAM RAHR
BY
Wheeler, Wheeler & Wheeler
ATTORNEYS Patented May 20, 1952

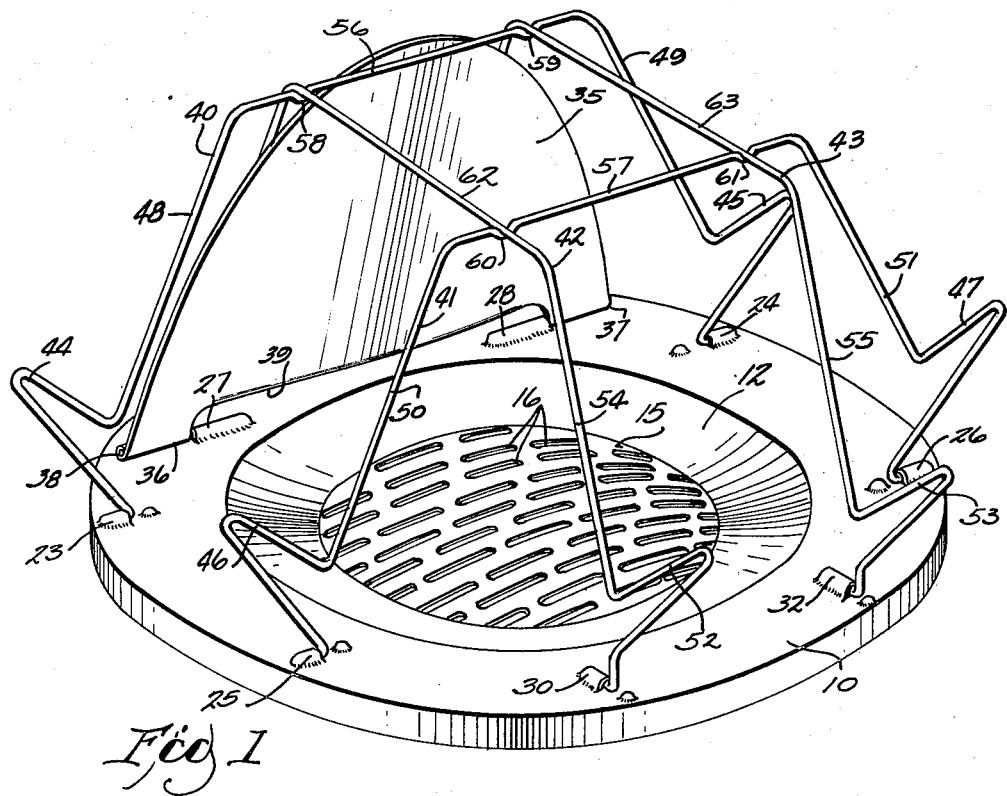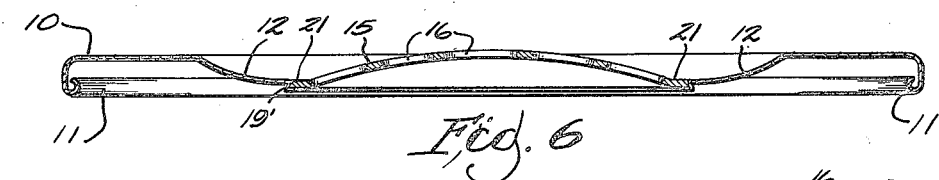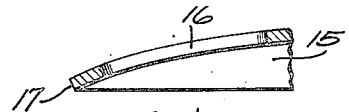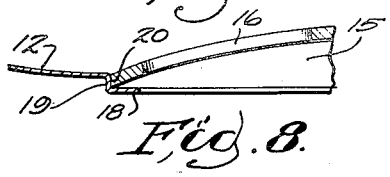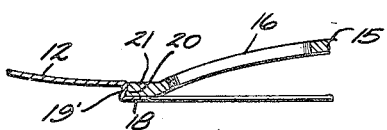

2,597,127

UNITED STATES PATENT OFFICE 2,597,127

TOASTER

William Rahr, Manitowoc, Wis., assignor to
J. W. Steckbauer, Manitowoc, Wis.

Application October 18, 1946, Serial No. 704,019

6 Claims. (Cl. 99—401)

1

This invention relates to improvements in toasters.

It is a primary object of the invention to provide a novel and improved type of radiant toaster, partly designed for gas or other non-electric heat, and adapted to provide speedy, uniform toasting for one or more slices of bread, the toasting operation being entirely independent of the number of slices acted upon, within the capacity of the device.

It is a further object of the invention to provide a toaster which will function with exceptional speed, as well as uniformity, and one which can be manufactured at low cost.

A further object of the invention is to provide a toaster which may be collapsed to compact form for storage and may be adjusted with great facility either in the collapse or erection of the toaster.

Still other objects of the invention will be apparent from the following disclosure thereof:

In the drawings:

Fig. 1 is a view in perspective showing my improved toaster erected in position for use.

Fig. 2 is a side elevation of the toaster.

Fig. 3 is a plan view of the toaster on a reduced scale, showing pieces of bread in position thereon to be toasted.

Fig. 4 is a view showing in plan the position of the parts when the toaster is collapsed for storage.

Fig. 5 is a detail view on the scale of Fig. 3 showing the reflector in plan.

Fig. 6 is a detail view in cross section diametrically through the base.

Fig. 7 is a fragmentary detail view of the radiant insert as preformed.

Fig. 8 shows the trimmed radiant insert associated with the base preliminary to interlocking engagement therewith.

Fig. 9 is a view similar to Figs. 7 and 8 showing the base and insert in their finally interlocked positions.

The base 10 may conveniently be made of sheet metal having a rolled supporting edge at 11 and a dished annular area 12 about a central opening in which the radiant insert 15 is held.

The insert 15 is provided with numerous openings at 16 which may take the form of slots, the function of such openings being to pass the products of combustion or gas or other flame by which the insert is heated. The diameter of the insert 15 is preferably sufficiently large to cover the burner so that substantially all products of combustion will pass through the insert, delivering off heat to the metal of the insert. Assembly

2 of the radiant insert with the base may conveniently be as follows:

The insert is first prefabricated to the form shown in Figure 7 which is more convex than its final form. Its circular edge 17 is substantially at a right angle to the adjacent portions of its upper and lower surfaces. The dished portion 12 of base 10 is formed with an annular flange 18 connected with the dish portion proper by a shoulder at 19 which is substantially vertical. The edge of the insert blank is now trimmed in the manner indicated at 20 so that it also is substantially vertical as distinguished from the form shown at 17 in Fig. 7. The perimeter 20 of the blank for the radiant element 15 will now just fit within the shoulder 19 as shown in Fig. 8.

Finally, with the parts assembled as in Fig. 8, the blank and flange 18 are subjected to a vertical axial pressure by a die which also reduces the convexity of the insert blank and flattens the margin 21 thereof, thus forcing the wedge shaped edge 20 into the shoulder 19 to deform such shoulder as indicated at 19' in Fig. 9. The flattened annular portion 21 of the insert is forced into face contact with flange 18. The flange provides support from beneath while the overhang of the deformed shoulder 19' effectively secures the edge 20 from escape upwardly, thus firmly interlocking and uniting the parts.

The sheet metal base 10 is provided with aligned pairs of eyes. The eyes 23, 24 comprise one such pair, the eyes 25, 26 comprise another such pair, the eyes 27, 28 comprise another such pair, the eyes 29, 30 comprise another such pair, and the eyes 31, 32 comprise another such pair.

The reflector 35 is made of sheet metal preferably reenforced by a marginal bead and having a predetermined convexity toward the center of the base as clearly shown in Figs. 2 and 5. The beaded margin of the reflector is generally arcuate in form as best shown in Fig. 1 and Fig. 4. It has almost 180° of extent and terminates at eyes 36, 37, which are substantially aligned with the eyes 27, 28 of the base. Pintles, one of which is shown at 38, extend through the registering eyes 36, 27 and the registering eyes 28, 37, thus hinging the reflector 35 for pivotal movement respecting the base. The bottom margin of the reflector is relieved at 39 to span the eyes 27, 28 which are integral with the base.

The remaining eyes of the base pivotally carry work supports of wire. Work supports 40, 41, 42, and 43 are conveniently made of wire. Each of these supports has its free ends engaged in the eyes of a given pair. Thus the free ends of the wire support 40 are engaged in eyes 23, 24. The free ends of support 41 are engaged in eyes 25, 26. The free ends of support 42 are engaged in eyes 29, 30, and the free ends of support 43 are engaged in eyes 31, 32. Adjacent their free ends each of the supports 40, 41, has annular offsets 44, 45, 46, 47 to provide brackets upon which the lower margins of a piece of bread are supported during toasting. From the respective bracket offsets, the supports are inclined inwardly and upwardly at 48, 49, 50 and 51. Against the inclined portions of the supports the bread rests at a predetermined angle during toasting. Supports 42, 43 have like bracket offsets 52, 53 and angularly inclined portions 54, 55, these being opposite the reflector 35. These supports extend downwardly behind the reflector but do not support a fourth piece of toast.

The several supports cross each other at a level slightly below the top margin of the reflector 35. The top margin of the reflector rests against, and its position is determined by, the horizontal portion 56 of support 40. This portion, and preferably also the corresponding portion 57 of support 41 is provided with shallow depressions 58, 59, 60, 61 in which the horizontal portions 62, 63 of supports 42, 43 are frictionally engaged to maintain the several supports in the erected positions in which they are shown in Figs. 1 to 3. To collapse the parts to the position shown in Fig. 4, sufficient pressure is applied laterally to supports 42 and 43 to swing these out of interlocking engagement with supports 40, 41. Thereupon support 40 and the reflector 35 may be swung forwardly and downwardly upon the face of the base 10. Support 41 pivots rearwardly and downwardly upon the base 10. Support 43 pivots to the left (as viewed in Fig. 4) and downwardly upon the base 10, and support 42 pivots to the right and downwardly upon the base 10.

Erection of the mechanism involves merely a reversal of these operations. Supports 42 and 43 are first swung upwardly and outwardly to permit support 41 and reflector 35 and support 40 to be raised in that order. With the horizontal portion 56 of support 40 positioning the reflector, supports 42 and 43 are moved back inwardly to a sufficient extent to reengage them in the depressions 58, 60, and 59, 61. They cross the reflector at either side of the highest part thereof and, extending downwardly behind the reflector, they hold the reflector against pivoting rearwardly from the desired position.

As best shown in Fig. 3, the pieces of bread 65, 66, and 67 resting on the respective bracket offsets 44, 46 and 45, 47, and 52, 53 are all inclined inwardly and upwardly over the radiant element 15. They are also inclined toward the convex and inwardly inclined reflector 35, this being due, in part, to the fact that the supporting wire 40 has slightly greater spread than supporting wire 41 so that the pieces of bread 65 and 66 diverge from each other rearwardly as indicated in Fig. 3.

With the parts assembled and proportioned and related as shown, the toasting of the bread will be perfectly uniform. Regardless of whether one, two or three slices of bread are positioned on the device, all surfaces will be toasted alike. The speed of toasting, over an ordinary gas flame, will exceed the speed of operation of an electric toaster, even though this toaster deals with a single face of the bread while an electric toaster is simultaneously operating on two faces of each slice. The heat seems to penetrate more deeply into the bread than in the case of an electric toaster, the toasting not being limited to the surface.

The ability to collapse the entire apparatus to a flat, compact form for storage and the fact that there are no inaccessible portions in which bread crumbs lodge are both of advantage in the practical use of the device.

I claim:

1. The combination with a base having a foraminous radiant central portion adapted to be heated over a flame, of a reflector inclined over said central portion at one side of the base, and work supporting means comprising easels for a plurality of work pieces at other sides of the central portion of the base, said central portion and reflector being convex toward the work supporting means and together adapted to distribute heat uniformly over the surfaces of work pieces carried by such means.

2. A toaster or the like comprising the combination with a base having a central foraminous radiant portion adapted to be heated over a flame and upwardly convex, of a reflector at one side of the radiant portion and inclined upwardly over such portion, said reflector being inwardly convex, work supporting means opposite said reflector including angularly inclined portions for carrying a piece of bread at an upward and inward inclination over the convex central portion of the base, and additional work supports at each side of the reflector and the first mentioned supporting means upwardly and inwardly inclined.

3. In a toaster or the like, the combination with a base, of a reflecting plate in direct hinged connection with the base for movement between a position in which said plate is folded on the base and another position in which said plate is erected above the base, and a plurality of easel means for supporting bread to receive radiant heat from the reflector, each of said easel means being foldably hinged to the base and certain of said easel means having portions engaged, in their erected positions, with the reflector for the positioning thereof.

4. In a device of the character described, the combination with a base, of a plurality of bread supporting easel wires in hinged connection with the base for movement between collapsed and erected positions, in further combination with a reflector directly hinged to said base for movement between collapsed and erected positions, certain of said wires and said reflector having interlocking portions engaged in the erected position of said wires and reflector for holding said wires and reflector in their said erected positions.

5. The combination with a base having pairs of eyes, of first and second easel wires having their ends engaged in the eyes of respective pairs, whereby such wires are bodily pivotal respecting the base, said wires having generally correspondingly inclined portions and bracket portions adapted to support opposing pieces of bread at inwardly sloping angles, third and fourth wires substantially at right angles to the first and second wires and having ends engaged in the opposing eyes of respective pairs on said face, said third and fourth wires having correspondingly inclined portions and bracket portions for supporting a piece of bread at an inward inclination between the pieces of bread first mentioned, a reflector having means pivotally connecting it with the respective eyes of another pair of eyes on said base, said reflector being convex and opposite the inclined portions and bracket means of the third and fourth wires, an upper portion of the reflector being confined, in its erected position, between the first wire and at least one of the wires last mentioned, the respective wires first and last mentioned having frictionally interlocked portions manually releasable to permit the collapse of the several wires and the reflector upon the base.

6. The combination set forth in claim 5 in which the said base is provided centrally and within its several pairs of eyes with a relatively heavier and upwardly convex foraminous radiant metal insert adapted to be positioned over a flame to deliver heat directly to bread supported on said wires and indirectly to such bread by means of said reflector, the convexity of the insert and the reflector together effecting substantially uniform heat distribution over all surfaces of bread supported by said wires.

WILLIAM RAHR.

REFERENCES CITED

The following references are of record in the file of this patent:

UNITED STATES PATENTS

| Number | Name | Date |
|---|---|---|
| 567,108 | Meier | Sept. 1, 1896 |
| 1,014,548 | Willis | Jan. 9, 1912 |
| 1,182,434 | Truitt | May 9, 1916 |
| 1,202,059 | Greener | Oct. 24, 1916 |
| 1,216,525 | Weaver | Feb. 20, 1917 |
| 1,353,203 | Wolff | Sept. 21, 1920 |
| 1,808,550 | Harpman | June 2, 1931 |
| 2,030,519 | Hamilton | Feb. 11, 1936 |
| 2,135,782 | McBirney | Nov. 8, 1938 |
| 2,155,623 | Strause | Apr. 25, 1939 |

FOREIGN PATENTS

| Number | Country | Date |
|---|---|---|
| 10,455 | Great Britain | 1911 |
| 22,418 | Great Britain | 1895 |
| 447,933 | Great Britain | May 28, 1936 |